United States Patent
Ebisumoto et al.

(10) Patent No.: US 12,403,776 B2
(45) Date of Patent: Sep. 2, 2025

(54) CONTROL DEVICE FOR ELECTRIC VEHICLE

(71) Applicant: Mazda Motor Corporation, Hiroshima (JP)

(72) Inventors: Hirofumi Ebisumoto, Aki-gun (JP); Tomohiro Yoshizue, Aki-gun (JP); Tsukasa Sori, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 348 days.

(21) Appl. No.: 18/188,728

(22) Filed: Mar. 23, 2023

(65) Prior Publication Data

US 2023/0311672 A1    Oct. 5, 2023

(30) Foreign Application Priority Data

Apr. 5, 2022    (JP) .................. 2022-062954

(51) Int. Cl.
*B60W 10/02* (2006.01)
*B60L 15/20* (2006.01)
*B60W 10/08* (2006.01)
*B60W 30/18* (2012.01)
*B60W 30/182* (2020.01)

(52) U.S. Cl.
CPC ......... *B60L 15/2054* (2013.01); *B60W 10/02* (2013.01); *B60W 10/08* (2013.01); *B60W 30/18172* (2013.01); *B60W 30/182* (2013.01); *B60W 2720/26* (2013.01)

(58) Field of Classification Search
CPC ... B60L 15/2054; B60W 10/02; B60W 10/08; B60W 30/18172; B60W 30/182; B60W 2720/26
See application file for complete search history.

(56) References Cited

U.S. PATENT DOCUMENTS

| | | | |
|---|---|---|---|
| 11,271,504 B2 | 3/2022 | Itasaka et al. | |
| 2007/0037661 A1* | 2/2007 | Yang | B60K 6/42 477/115 |
| 2008/0029361 A1* | 2/2008 | DeRoo | B60W 10/02 192/48.8 |
| 2014/0277014 A1* | 9/2014 | Higgins | A61B 17/320758 606/159 |

FOREIGN PATENT DOCUMENTS

JP    2021027615 A    2/2021

* cited by examiner

*Primary Examiner* — Edwin A Young
(74) *Attorney, Agent, or Firm* — Alleman Hall & Tuttle LLP

(57) ABSTRACT

A control device for an electric vehicle is provided, which includes a drive motor of which magnetic poles of a rotor are comprised of variable magnetism magnets, and a clutch disposed between the drive motor and driving wheels. When the electric vehicle travels, the control device performs a torque control, and a first clutch control in which an engaging torque of the clutch is controlled to be higher than a demanded torque. When performing a magnetization control when the electric vehicle travels, the control device changes the clutch control from the first clutch control to a second clutch control in which the engaging torque is made to coincide with the demanded torque, before the execution of the magnetization control, and adds a given slip torque to the demanded torque to start a micro slip control in which the clutch is transitioned from an engaged state into a micro slip state.

8 Claims, 13 Drawing Sheets

CONTROL DEVICE FOR ELECTRIC VEHICLE

TECHNICAL FIELD

The disclosed technique relates to a control device for an electric vehicle (including a hybrid vehicle) capable of traveling using electric power.

BACKGROUND OF THE DISCLOSURE

JP2021-027615A discloses a hybrid vehicle which carries a permanent magnet synchronous drive motor. This drive motor uses variable magnetism magnets, which can change the magnetism, for the permanent magnets which are installed in the rotor.

The output range of the drive motor is divided into a plurality of magnetization ranges, and an optimum magnetism value is set to each magnetization range. When the output of the drive motor shifts between these magnetization ranges, the magnetism of the variable magnetism magnet is changed to the optimum magnetism value for the transitional destination.

When changing the magnetism of the variable magnetism magnet, a large current for magnetization (so-called d-axis current) is applied to stator coils of the drive motor. Therefore, this interferes with a driving current (so-called q-axis current) for changing a torque. That is, the d-axis current is a component perpendicular to the q-axis current, which generates the torque. Therefore, although the large current itself will not be outputted as the torque, it interferes with the q-axis current for changing the torque.

If the change in the magnetism is a demagnetization (decrease in the magnetism), the torque changes to be lower, and if the change in the magnetism is a magnetization (increase in the magnetism), the torque changes to be higher. Therefore, when changing the magnetism of the variable magnetism magnet to magnetize, a high torque is outputted from the drive motor. Generally, since an engaging torque of a clutch provided between the drive motor and driving wheels is higher than a demanded torque, when the torque is transmitted to the driving wheels, a torque shock occurs on the traveling vehicle, and it may give uncomfortableness to a driver.

In order to suppress such a torque shock, a slip of the clutch installed between the drive motor and the driving wheels may be induced. That is, if the clutch is made to slip, even when the high torque is outputted from the drive motor, the torque transmitted to the driving wheels can be reduced, which can ease the torque shock.

However, when the clutch is made to slip, a phenomenon in which rotation of the drive motor increases rapidly (so-called "sudden speed rise") occurs. Such a phenomenon of the sudden speed rise may damage the clutch with frictional heat caused by the slip, if it is not eliminated promptly.

Thus, the present inventors proposed previously a technique for promptly eliminating the sudden speed rise of the drive motor accompanying such a slip of the clutch (JP2022-187694A).

According to this technique, roughly, when the slip of the clutch occurs by the magnetization, the control is changed from a torque control in which the output is controlled using the demanded torque as a target to a power control in which the output is controlled using the outputted power as a target. Therefore, the rotational speed can also be converged along with the outputted torque, and the sudden speed rise of the drive motor can be eliminated promptly.

Problem of Friction Coefficient Difference of Clutch

Generally, a coefficient of dynamic friction ($\mu_d$) of the clutch is set equivalent to a coefficient of static friction ($\mu_s$). Therefore, even when the friction coefficient changes while engaging the clutch, the torque shock hardly occurs. Therefore, there is no problem also in the previously proposed technique.

However, depending on the clutch, the coefficient of dynamic friction may be lower than the coefficient of static friction, and the difference therebetween may be large. In such a case, also in the previously proposed technique, the torque shock which originates in the friction coefficient difference during engagement of the clutch may occur, and it may cause uncomfortableness for the driver.

SUMMARY OF THE DISCLOSURE

The disclosed technique suppresses a torque variation which occurs with a magnetism change in a drive motor, without being influenced by the performance of a clutch.

The disclosed technique relates to a control device for an electric vehicle including a drive motor of which magnetic poles of a rotor are comprised of variable magnetism magnets that are able to change magnetism, and a clutch disposed between the drive motor and driving wheels, the electric vehicle being travelable using electric power.

When the electric vehicle travels, the control device performs a torque control in which a motor torque outputted from the drive motor is controlled so that the motor torque coincides with a demanded torque demanded to be outputted to the driving wheels, and a first clutch control in which an engaging torque of the clutch is controlled to be higher than the demanded torque.

Further, when performing a magnetization control in which the magnetism of the variable magnetism magnet is changed to magnetize the variable magnetism magnet when the electric vehicle travels, the control device changes the clutch control from the first clutch control to a second clutch control in which the engaging torque is made to coincide with the demanded torque, before the execution of the magnetization control, and adds a given slip torque to the demanded torque based on a coefficient of dynamic friction and a coefficient of static friction of the clutch to start a micro slip control in which the clutch is transitioned from an engaged state into a micro slip state.

That is, according to this configuration, similarly to the previously proposed technique, when performing the magnetization control while the electric vehicle travels, the first clutch control is changed to the second clutch control in which the engaging torque is made to coincide with the demanded torque, before the execution of the magnetization control. Thus, the clutch slips, and the torque shock which originates in the magnetization can be suppressed.

Further, by adding the given slip torque to the demanded torque based on the coefficient of dynamic friction and the coefficient of static friction of the clutch, the micro slip control for transitioning the clutch from the engaged state to the micro slip state is started.

That is, the clutch is not transitioned from the engaged state to the disengaged state at the timing of the magnetization control when the rotational speed difference of the clutch increases rapidly, but before that, it is transitioned from the engaged state to the micro slip state by adding the given slip torque to the demanded torque. Therefore, since the friction coefficient can be changed beforehand from the coefficient of static friction to the coefficient of dynamic friction under a condition of the small rotational speed difference, the torque shock which originates in the friction coefficient difference can be suppressed.

Therefore, according to this control device, the torque variation which occurs with the magnetism change of the drive motor can be suppressed, without being influenced by the performance of the clutch.

When the micro slip control is started, a transitional control may be performed. The transitional control may include adjusting a hydraulic pressure of the clutch so that a torque variation caused in connection with transitioning the clutch from the engaged state to the micro slip state is canceled out.

When the micro slip control is started, the clutch changes from the engaged state to the micro slip state. In connection with the change in the state of the clutch, the torque variation resulting from the friction coefficient difference of the clutch occurs, although it is smaller than at the timing of the magnetization control.

Unlike the outputted torque in the magnetization control which is irregular and is difficult to be identified beforehand, the slip torque which is increased or decreased in the micro slip control is set beforehand. Since the torque variation which occurs in connection with the change in the friction coefficient when the micro slip control is started is defined by the slip torque, an adjustment according to the torque variation can be performed, even if the control is the hydraulic control which is inferior in the response.

Therefore, by setting a condition of the hydraulic control which can cancel out the torque variation and adjusting the hydraulic pressure (pressing force) of the clutch based on the condition, the micro torque shock which occurs at the start of the micro slip control can also be suppressed.

During the execution of the micro slip control, a power control may be performed, instead of the torque control. The power control may include controlling the motor torque so that power outputted from the driving wheels coincides with a given target power value.

Unlike in the torque control in which the rotational speed is only made to follow the torque, according to the power control, both the rotational speed and the torque can be adjusted with sufficient balance. Thus, during the execution of the micro slip control, the state can be stably converged to the micro slip state by adjusting both the torque and the rotational speed of the drive motor with sufficient balance.

After the execution of the magnetization control, a feedback control may be performed based on a difference between a rotational speed on an input side of the clutch and a rotational speed on an output side to converge the state to the micro slip state during the execution of the power control.

Thus, the state can be quickly converged to the micro slip state.

When the micro slip control is ended, a transitional control may be performed. The transitional control may include adjusting the hydraulic pressure of the clutch so that a torque variation caused in connection with transitioning the clutch from the micro slip state to the engaged state is canceled out.

Thus, the micro torque shock which occurs when the micro slip control is ended can also be suppressed. As a result, the magnetism change of the drive motor in an almost shockless state becomes possible.

DETAILED DESCRIPTION OF THE DISCLOSURE

Hereinafter, the disclosed technique is described. However, the following description is only illustration essentially.

Electric Vehicle

Figure 1:
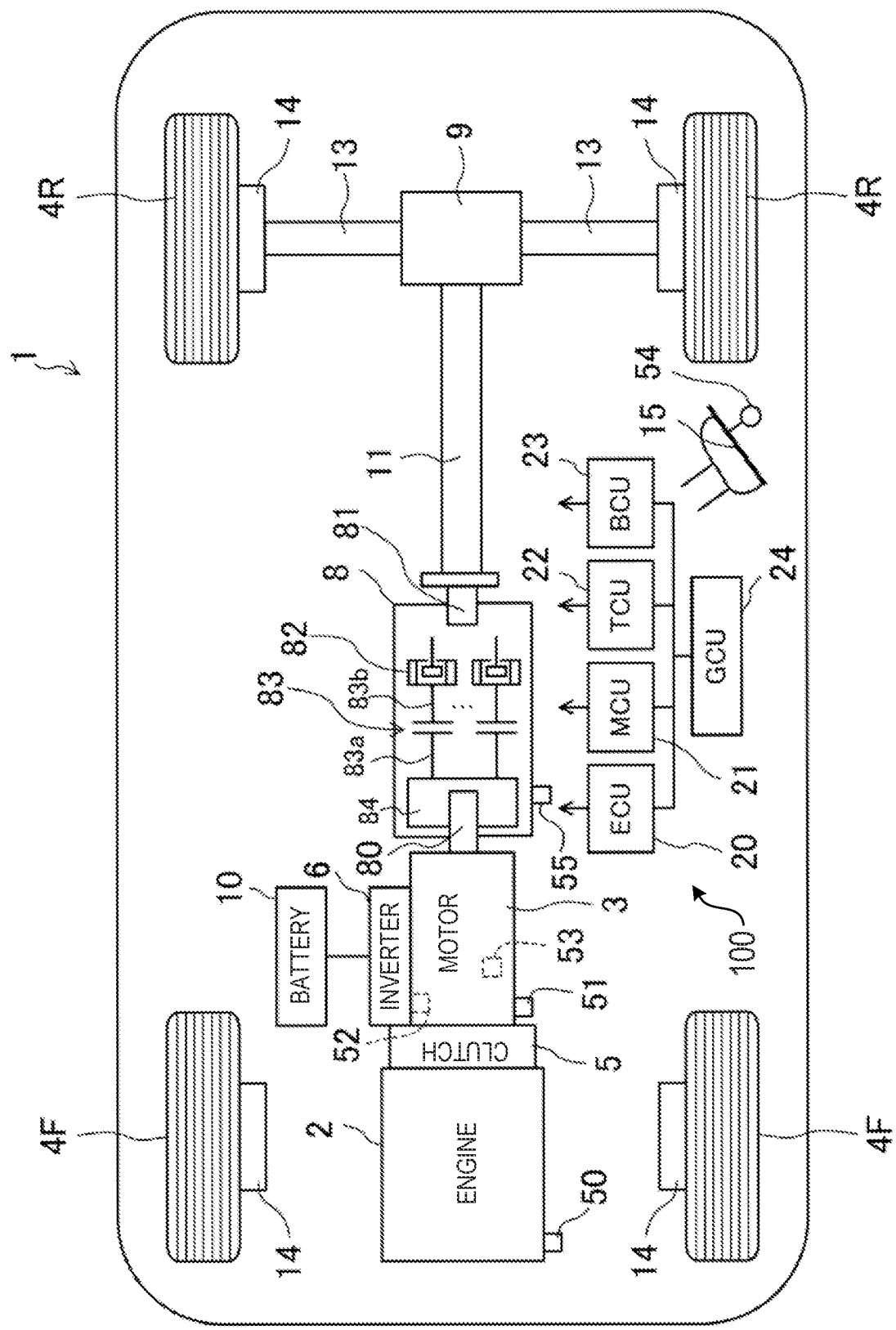
FIG. 1 is a schematic view illustrating a main configuration of an automobile to which the disclosed technique is applied.

FIG. 1 illustrates an automobile 1 (one example of an electric vehicle) to which the disclosed technique is applied. This automobile 1 is a hybrid vehicle capable of traveling by electric power. An engine 2 and a drive motor 3 are mounted as drive sources of the automobile 1. These collaborate with each other to drive, among four wheels 4F, 4F, 4R, and 4R, two wheels (driving wheels 4R) located in a left-right symmetry manner. Thus, the automobile 1 travels. Note that the automobile 1 may be an electric vehicle only carrying the drive motor 3. The automobile 1 may be a four-wheel-drive vehicle.

In this automobile 1, the engine 2 is disposed at the front side of the vehicle body, and the driving wheels 4R are disposed at the rear side of the vehicle body. That is, this automobile 1 is a so-called "front-engine, rear-wheel-drive (FR) vehicle." Further, in this automobile 1, the engine 2 mainly serves as a drive source, rather than the drive motor 3, and the drive motor 3 is used to assist the drive of the engine 2 (so-called "mild hybrid"). Further, the drive motor 3 is not only used as the drive source, but also used as a generator during regeneration.

The automobile 1 includes, in addition to the engine 2 and the drive motor 3, a relay clutch 5, an inverter 6, a transmission 8, a differential gear 9, and a battery 10, as devices in the drive system. The automobile 1 also includes, as devices in the control system, an engine control unit (ECU) 20, a motor control unit (MCU) 21, a transmission control unit (TCU) 22, a brake control unit (BCU) 23, and a general control unit (GCU) 24. An engine speed sensor 50, a motor rotation sensor 51, a current sensor 52, a magnetism sensor 53, an accelerator sensor 54, and a transmission sensor 55 are installed in the automobile 1 along with the devices in the control system.

Devices in Drive System

The engine 2 is an internal combustion engine which combusts, for example, gasoline used as fuel. Further, the engine 2 is a so-called four-cycle engine which generates a rotational motive force by repeating a cycle of intake, compression, expansion, and exhaust. Although there are various kinds and modes of the engine 2, such as a diesel engine, the kind or the mode of the engine is not limited in particular in this disclosed technique.

In this automobile 1, the engine 2 is disposed in a substantially center part in the vehicle width direction so that an output shaft which outputs the rotational motive force is oriented in the front-and-rear direction of the vehicle body. Although various devices and mechanisms accompanying the engine 2, such as an intake system, an exhaust system, and a fuel feed system, are installed in the automobile 1, illustration and description thereof are omitted.

Figure 2:
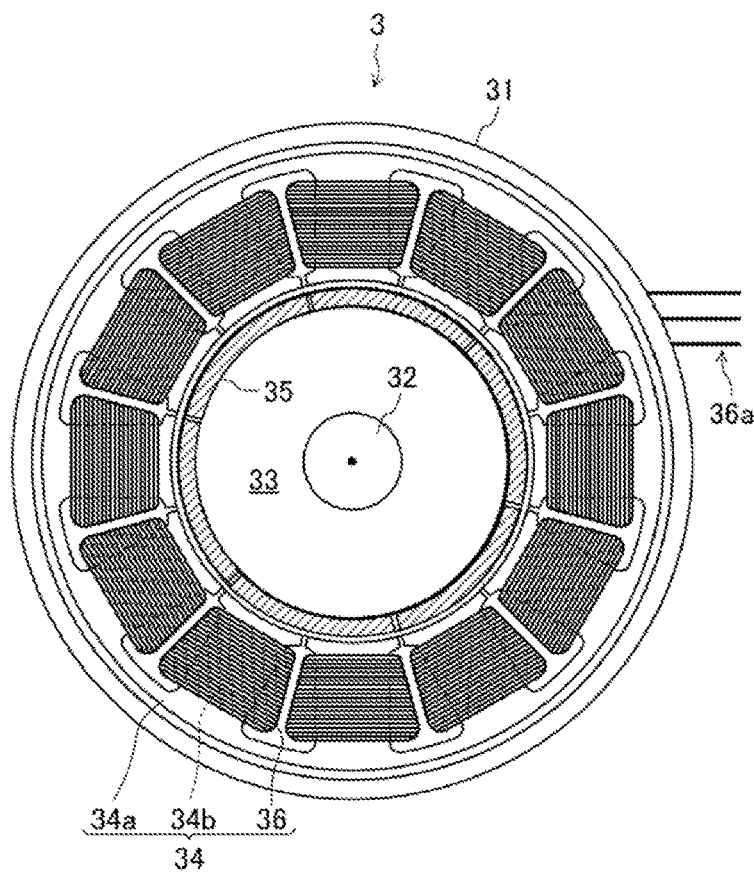
FIG. 2 is an outline cross-sectional view illustrating a configuration of a drive motor.

The drive motor 3 is disposed in series to the engine 2, behind the engine 2 via the relay clutch 5. The drive motor 3 is a permanent-magnet type synchronous motor which is driven by three-phase alternating current. As illustrated in FIG. 2 in a simplified manner, the drive motor 3 is roughly comprised of a motor case 31, a shaft 32, a rotor 33, and a stator 34.

The motor case 31 is comprised of a container having a cylindrical space therein, where a front end surface and a rear end face are closed, and is fixed to the vehicle body of the automobile 1. The rotor 33 and the stator 34 are accommodated in the motor case 31. The shaft 32 is rotatably supported by the motor case 31 in a state where a front end part and a rear end part project from the motor case 31.

The relay clutch 5 is installed so that it intervenes between the front end part of the shaft 32 and the output shaft of the engine 2. The relay clutch 5 is configured to be able to change between a state where the output shaft of the engine 2 is coupled to the shaft 32 (engaged state) and a state where the output shaft of the engine 2 is decoupled from the shaft 32 (disengaged state).

The rear end part of the shaft 32 is coupled to an input shaft 80 of the transmission 8. Note that a second relay clutch may be provided between the shaft 32 and the input shaft 80 of the transmission 8.

The rotor 33 is comprised of a cylindrical member configured by laminating a plurality of metal plates, each having a shaft hole at the center. The rotor 33 is integrated with the shaft 32 by fixing an intermediate part of the shaft 32 to the shaft hole of the rotor 33.

A magnet 35 is installed throughout an outer circumferential part of the rotor 33. The magnet 35 is configured so that different magnetic poles (i.e., S-pole and N-pole) are located alternately at equal intervals in the circumferential direction. The magnet 35 may be comprised of a sole cylindrical magnet having a plurality of magnetic poles, or may be comprised of a plurality of arc-shaped magnets, each constituting one of the magnetic poles.

Further, the drive motor 3 is configured so that the magnet 35 is able to change the magnitude of the magnetism (variable magnetism magnet 35). Normally, for this kind of the drive motor 3, a magnet (permanent magnet) in which a coercivity (coercive force) is large and the magnetism stays over a long period of time is used. In this drive motor 3, a permanent magnet with a small coercivity is used as the variable magnetism magnet 35 so that the magnetism can be changed comparatively easily.

There are various kinds of permanent magnets, such as a ferrite magnet, a neodymium magnet, a samarium cobalt magnet, and an Alnico magnet, with different coercivities. The kind and the material of the variable magnetism magnet 35 may be selected according to specifications, and are not limited in particular.

The cylindrical stator 34 is installed around the rotor 33 with a small gap (inner rotor type). The stator 34 has a stator core 34a comprised of a plurality of laminated metal plates, and a plurality of coils 36 configured by winding electric wires around the stator core 34a.

The stator core 34a is provided with a plurality of teeth 34b which project radially inwardly, and the plurality of coils 36 are formed by winding the electric wires around the teeth 34b in a given order. These coils 36 constitute three-phase coil groups of U-phase, V-phase, and W-phase.

In order to supply each phase of coil group, a connecting cable 36a is drawn from each phase of coil group to the outside of the motor case 31. These connecting cables 36a are coupled to the battery 10 mounted on the vehicle as a driving power source via the inverter 6. In this automobile 1, the battery 10 is a direct-current battery below 50V (in detail, 48V) in the rated voltage.

The battery 10 supplies direct current power to the inverter 6. The inverter 6 converts the direct current power into three-phase alternating current, and supplies the current to the drive motor 3. Therefore, the rotor 33 rotates, and the power (rotational motive force) of the drive motor 3 is outputted to the transmission 8 via the shaft 32.

In this automobile 1, the transmission 8 is a multi-stage automatic transmission (so-called "AT"). As illustrated in FIG. 1, the transmission 8 has the input shaft 80 at one end thereof, and the input shaft 80 is coupled to the drive motor 3 (shaft 32). The other end of the transmission 8 has an output shaft 81 which rotates independently from the input shaft 80. Between the input shaft 80 and the output shaft 81, a transmission mechanism comprised of a torque converter 84, a plurality of planetary gear mechanisms 82, and a plurality of transmission clutches 83 (including brake(s)) is incorporated.

By switching the transmission mechanism, a change in the gear ratio, such as a change between traveling forward and rearward (reverse), a change into a different rotational speed between the input shaft 80 and the output shaft 81 of the transmission 8.

For example, an input side 83a of each transmission clutch 83 can be coupled to the input shaft 80 via the torque converter 84. An output side 83b of each transmission clutch 83 is coupled to the output shaft 81 via the corresponding planetary gear mechanism 82. When a specific transmission clutch 83 is selected and this transmission clutch 83 is engaged, the input shaft 80 of the transmission 8 is coupled to the output shaft 81 via the transmission clutch 83 and the corresponding planetary gear mechanism 82. Therefore, the gear ratio is changed.

The output shaft 81 is coupled to the differential gear 9 via a propeller shaft 11 which extends in the front-and-rear direction of the vehicle body and is disposed coaxially with the output shaft 81. The differential gear 9 is coupled to a pair of driving shafts 13 which extend in the vehicle width direction and are coupled to the left and right driving wheels 4R. The rotational motive force outputted through the propeller shaft 11 is divided by the differential gear 9, and is transmitted to the driving wheels 4R through the pair of driving shafts 13, respectively. A brake 14 is attached to each of the wheels 4F and 4R in order to brake the rotation.

Devices in Control System

In the automobile 1, the modules, such as the ECU 20, the MCU 21, the TCU 22, the BCU 23, and the GCU 24, which are described above, are installed in order to control the traveling of the automobile 1 according to driver's operation. Each of these modules is comprised of hardware, such as a processor, memory, and an interface, and software, such as a database and a control program. These modules are connected with each other, for example, via a CAN (Controller Area Network), and are configured to be telecommunicatable with each other.

The ECU 20 is a module which mainly controls operation of the engine 2. The MCU 21 is a module which mainly controls operation of the drive motor 3. The TCU 22 is a module which mainly controls operation of the transmission 8. The BCU 23 is a module which mainly controls operation of the brake 14. The GCU 24 is a high-order or host module which is electrically connected to the ECU 20, the MCU 21, the TCU 22, and the BCU 23, and comprehensively controls these modules.

One example of the control device in the disclosed technique is control device 100 (see FIG. 1) comprised of these modules. Particularly, the MCU 21 which mainly controls the operation of the drive motor 3 and the TCU 22 which mainly controls the operation of the transmission 8 mainly constitute the control device 100. By these modules collaborating with each other, a micro slip control which will be described later is performed.

The engine speed sensor 50 is attached to the engine 2, detects an engine speed of the engine 2, and outputs it to the ECU 20. The motor rotation sensor 51 is attached to the drive motor 3, detects a rotational speed and a rotational position of the drive motor 3, and outputs them to the MCU 21. The current sensor 52 is attached to the connecting cable 36a, detects a value of current which is supplied to each coil 36, and outputs it to the MCU 21.

The magnetism sensor 53 is attached to the drive motor 3, detects a magnetism of the variable magnetism magnet 35, and outputs it to the MCU 21. The accelerator sensor 54 is attached to an accelerator pedal (accelerator 15) which is stepped on by the driver when driving the automobile 1, detects an accelerator opening corresponding to the output demanded for driving the automobile 1, and outputs it to the ECU 20. The transmission sensor 55 detects a rotational speed and an engaging torque of each transmission clutch 83, a rotational speed of the output shaft 81, etc., and outputs them to the TCU 22.

By the modules collaborating and controlling the devices in the drive system based on signals of the detection values inputted from these sensors, the automobile 1 travels. For example, when the automobile 1 travels with the driving force of the engine 2, the ECU 20 controls the operation of the engine 2 based on the detection values of the accelerator sensor 54 and the engine speed sensor 50.

Further, the TCU 22 controls so that the relay clutch 5 becomes in an engaged state, and changes the transmission mechanism of the transmission 8 according to the operating state of the automobile 1. During braking of the automobile 1, the BCU 23 controls each brake 14. During braking with regeneration, the TCU 22 controls the relay clutch 5 to be in a disengaged state or a partially engaged state, and engages a given transmission clutch 83 of the transmission 8. Thus, the MCU 21 generates power with the drive motor 3, and it controls so that the electric power is collected by the battery 10.

Control of Drive Motor

The MCU 21 controls so that the automobile 1 travels while using the power outputted from the drive motor 3 in a state where the drive motor 3 solely outputs the power, or in a state where the drive motor 3 assists the output of the engine 2 as needed.

In detail, the ECU 20 sets the torque outputted from the engine 2 based on the detection values of the accelerator sensor 54, the engine speed sensor 50, etc. Accordingly, the GCU 24 sets a demanded amount of torque to the drive motor 3 (demanded torque) within a given output range according to a preset distribution ratio of the output between the engine 2 and the drive motor 3. The MCU 21 controls the drive motor 3 so that the demanded torque is outputted.

Figure 3:
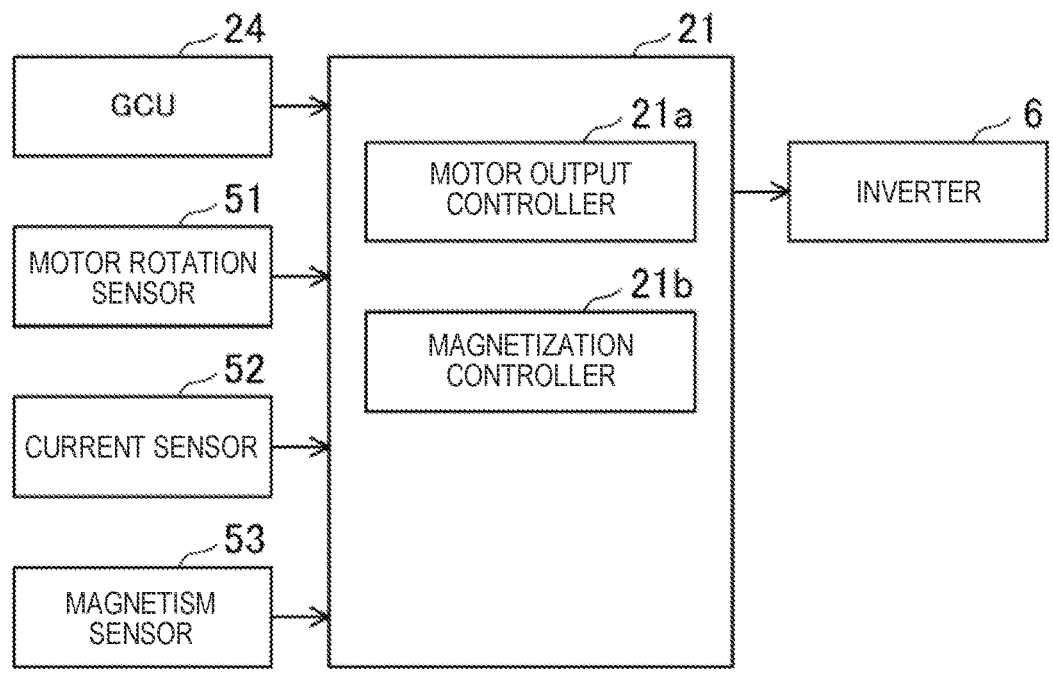
FIG. 3 is a block diagram illustrating a motor control unit (MCU) and primary input/output (I/O) devices relevant to the MCU.

FIG. 3 illustrates the MCU 21 and primary input/output (I/O) devices relevant to the MCU 21. The MCU 21 is provided with a motor output controller 21a and a magnetization controller 21b, which are comprised of hardware and software, as functional configurations. The motor output controller 21a has a function for controlling the drive of the drive motor 3, and makes the drive motor 3 output the demanded power by controlling driving current which flows into the coils 36.

On the other hand, the magnetization controller 21b has a function for raising a power factor of the drive motor 3, and converts the magnetism of the variable magnetism magnet 35 by controlling magnetizing current which flows into the coils 36. In detail, the magnetism of the variable magnetism magnet 35 is changed so that it may substantially coincide with an electromagnetic force which is caused in the coils 36 by the driving current.

The power factor is a ratio of available power (electric power actually consumed) to apparent power (electric power supplied to the drive motor 3). If the power factor is low, it becomes necessary to supply large current to obtain the same output. Thus, the motor needs to be enlarged. Therefore, by raising the power factor of the drive motor 3, the drive motor 3 can be reduced in the weight and the size. Further, as the power factor increases, the generating capacity during regeneration also increases.

Output Range of Drive Motor

Figure 4:
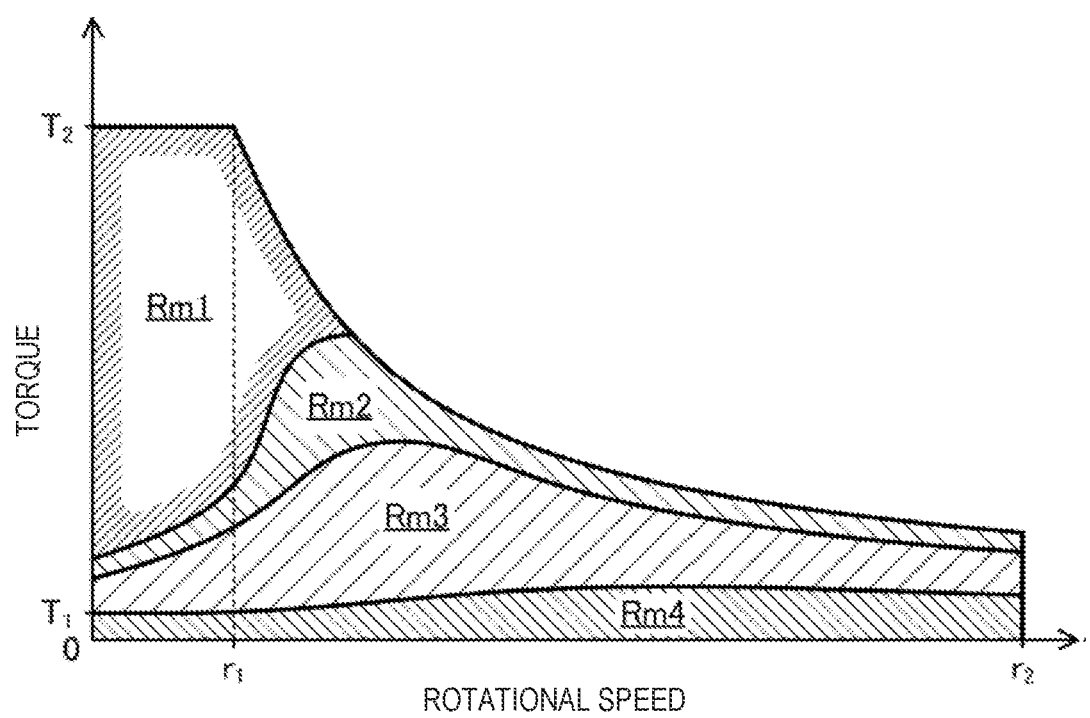
FIG. 4 is a graph illustrating an output range of the drive motor.

FIG. 4 illustrates the output range of the drive motor 3. The output range is defined by a maximum load line indicative of an upper limit of the torque (load) according to the rotational speed.

In detail, the upper limit of the torque is held at a maximum torque (T2) in a low-speed range up to a given rotational speed (r1). In a middle-speed range and a high-speed range where the rotational speed is higher than in the low-speed range, the upper limit of the torque is gradually decreased until the rotational speed reaches an upper limit (r2).

In the MCU 21, data, such as a map and a table, which defines such an output range is set beforehand. The motor output controller 21a controls the drive motor 3 in its output range by looking up the data.

Further, this output range of the drive motor 3 is divided into a plurality of magnetization ranges. The magnetization controller 21b changes the magnetism of the variable magnetism magnet 35 according to each magnetization range.

As illustrated in FIG. 4, in this embodiment, the output range of the drive motor 3 is divided into four magnetization ranges (first to fourth magnetization ranges). In detail, it is divided into a first magnetization range Rm1 which eccentrically resides on the low-speed side, and which is high in the load, including the maximum torque T2, a second magnetization range Rm2 which extends from the low-speed side to the high-speed side, which is lower in the load than the first magnetization range Rm1, and which has a torque peak in the middle speed, a third magnetization range Rm3 which is lower in the load than the second magnetization range Rm2, and of which the torque peak shifts to the higher-speed side than in the second magnetization range Rm2, and a fourth magnetization range Rm4 which is lower in the load than the third magnetization range Rm3, and which includes a torque T1 at which the drive motor 3 idles (a torque which does not contribute to the traveling of the automobile 1).

An optimal magnetism value (optimum magnetism value) for achieving the high power factor is set to each of the magnetization ranges, corresponding to each output. For example, in the first magnetization range Rm1, an initial magnetism of the variable magnetism magnet 35 is set as the optimum magnetism value (first optimum magnetism value). In the second magnetization range Rm2, a lower optimum magnetism value than the first optimum magnetism value is set (second optimum magnetism value). Further, in the third magnetization range Rm3, a third optimum magnetism value lower than the second optimum magnetism value is set, and in the fourth magnetization range Rm4, a fourth optimum magnetism value lower than the third optimum magnetism value is set.

The magnetization controller 21b estimates the optimal magnetization range based on the operating state of the automobile 1, and when the magnetization range shifts to another, adjacent magnetization range, it changes the magnetism of the variable magnetism magnet 35 to the optimum magnetism value corresponding to the magnetization range. For example, when shifting from the first magnetization range Rm1 to the second magnetization range Rm2, demagnetization processing is performed in the drive motor 3 so that the magnetism of the variable magnetism magnet 35 is changed from the first optimum magnetism value to the second optimum magnetism value.

Moreover, for example, when shifting from the third magnetization range Rm3 to the second magnetization range Rm2, magnetization processing is performed in the drive motor 3 so that the magnetism of the variable magnetism magnet 35 is changed from the third optimum magnetism value to the second optimum magnetism value.

Concrete Example of Control of Drive Motor

Figure 5:
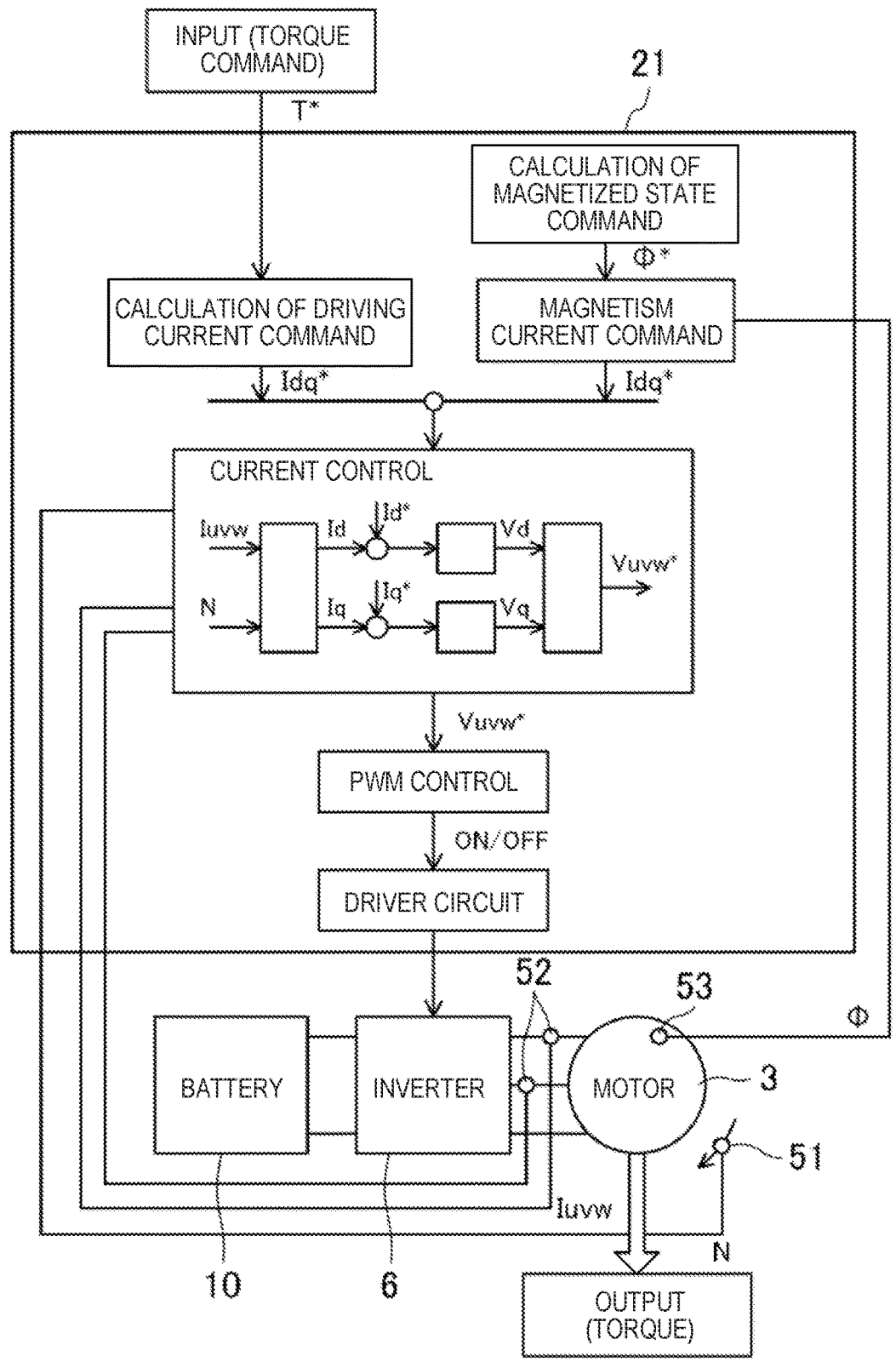
FIG. 5 is a system chart related to a control of the drive motor illustrated in a simplified manner.
Figure 6:
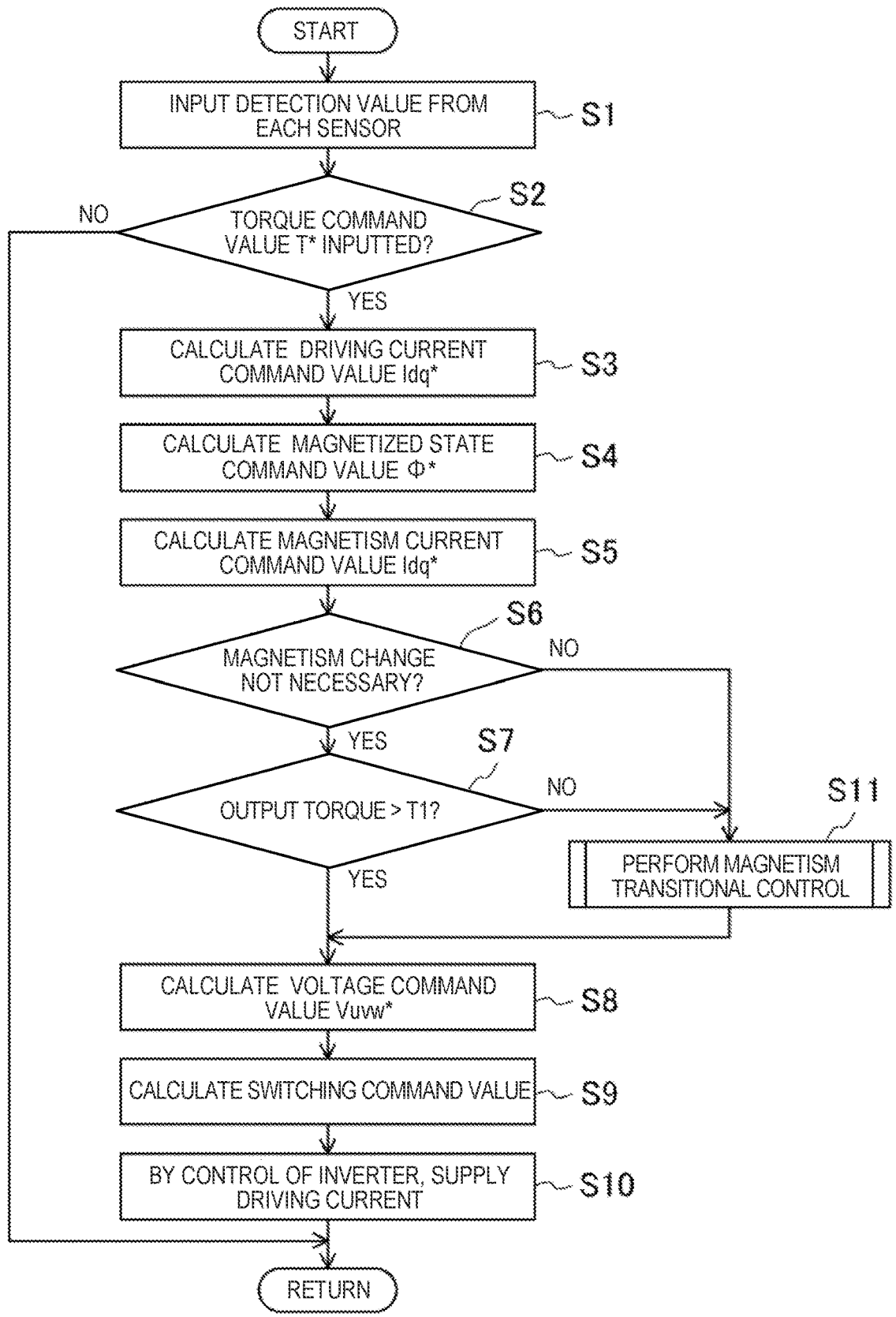
FIG. 6 is a flowchart illustrating one example of the control of the drive motor.

FIG. 5 illustrates a simplified system chart related to the control of the drive motor 3. FIG. 6 illustrates one example of the control of the drive motor 3 performed by the MCU 21. A flow of the concrete control of the drive motor 3 is described with reference to these drawings. Note that the drive motor 3 is controlled by a vector control which uses a torque current command Iq* and an exciting current command Id*.

When the automobile 1 becomes in a travelable state, the detection values are always inputted from the current sensor 52, the motor rotation sensor 51, and the magnetism sensor 53 into the MCU 21 (Step S1). Further, the detection values are always inputted from the accelerator sensor 54 and the engine speed sensor 50 similarly into the ECU 20.

The GCU 24 acquires the detection value of the accelerator sensor 54 from the ECU 20, and sets a torque which is requested to the drive motor 3 (demanded torque) among the torques to be outputted to the driving wheels 4R according to the preset distribution ratio of the output between the engine 2 and the drive motor 3. The GCU 24 outputs a command for outputting the demanded torque (torque command value T*) to the MCU 21.

That is, the MCU 21 controls the output of the drive motor 3 based on a given target torque (so-called "torque control"). By the torque control, the torque outputted from the drive motor 3 (motor torque) is controlled to coincide with the target torque. Therefore, when the command described above is inputted while the automobile 1 travels, the MCU 21 controls the drive motor 3 by using the demanded torque as the target torque. By the torque control of the drive motor 3, the automobile 1 travels according to the driver's demand.

As described above, while the automobile 1 travels, the torque control is interrupted when the magnetization range shifts, and a control for applying a high voltage to the coils 36 of the drive motor 3 is performed (magnetism transitional control). By the magnetism transitional control, the magnetism of the variable magnetism magnet 35 is changed.

In detail, when the torque command value T* is inputted (Yes at Step S2), the MCU 21 (motor output controller 21a) performs computational processing of a command (driving current command value Idq*) which outputs an amount of change in the driving current (torque current component) which causes the torque (Step S3). Further, the MCU 21 (magnetization controller 21b) performs computational processing of a command (magnetized state command value Φ*) which outputs an optimum magnetism value corresponding to the suitable magnetization range (Step S4). The magnetization controller 21b performs computational processing of a command (magnetism current command value Idq*) which outputs a torque current component equivalent to an amount of change in the magnetism of the variable magnetism magnet 35 based on the magnetized state command value Φ* (Step S5).

The MCU 21 determines whether the magnetism of the variable magnetism magnet 35 needs to be changed, based on the driving current command value Idq* and the magnetism current command value Idq* which are calculated (Step S6). For example, as described above, if the demanded torque is outputted, it is determined that the magnetism of the variable magnetism magnet 35 needs to be changed, when the magnetization range shifts to another magnetization range, and even if the demanded torque is outputted, when the magnetization range stays the same, it is determined that the change in the magnetism of the variable magnetism magnet 35 is not necessary.

Then, if the MCU 21 determines that the change in the magnetism of the variable magnetism magnet 35 is not necessary, it determines whether the output torque is larger than the torque T1 when the drive motor 3 idles (Step S7). Then, if the output torque is larger than the torque T1, the MCU 21 controls the drive motor 3 by the normal vector control.

That is, the motor output controller 21a performs, by a current control, computational processing of a command (voltage command value Vuvw*) which is outputted for performing a pulse width modulation (PWM) control, based on the detection values of the current sensor 52 and the motor rotation sensor 51 (Step S8). Then, a switching command value is calculated by the PWM control (Step S9).

By the switching command value being outputted to the inverter 6 through the driver circuit, a plurality of switching elements are on-off controlled inside the inverter 6. Therefore, the given three-phase alternating current (driving current) is supplied to each coil group so that the drive motor 3 rotates with the demanded torque (Step S10).

On the other hand, if the MCU 21 determines that the magnetism of the variable magnetism magnet 35 needs to be changed (No at Step S6), the magnetization controller 21b performs the magnetism transitional control (Step S11).

Further, even if the MCU 21 determines that the change in the magnetism of the variable magnetism magnet 35 is not necessary, if it is determined that the output torque is less than the torque T1 at which the drive motor 3 idles (No at Step S7), the magnetization controller 21b performs the magnetism transitional control (Step S11).

That is, when the demanded amount of the rotational motive force of the drive motor 3 becomes almost 0 (zero), the variable magnetism magnet 35 is reset so that the magnetism is changed to the initial state. For example, the automobile 1 may accelerate rapidly from the idle state or the stopped state when the accelerator 15 being depressed instantaneously.

Since the initial magnetism is set highly in the variable magnetism magnet 35 according to the high load, the drive motor 3 can be driven appropriately by resetting the magnetism at idle, even when such a rapid acceleration is performed.

Figure 7:
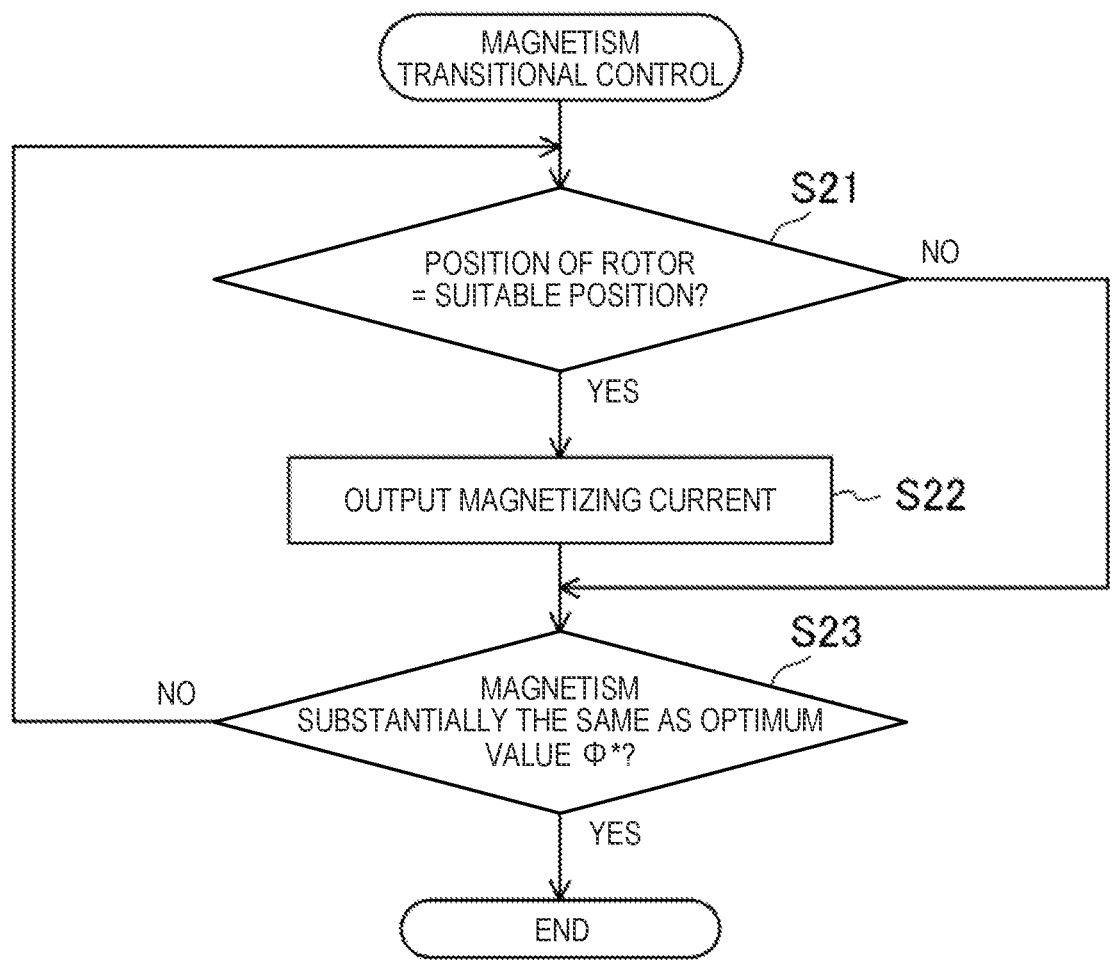
FIG. 7 is a flowchart illustrating a flow of main processing of a magnetism transitional control.

FIG. 7 illustrates a flow of main processing of the magnetism transitional control. If the magnetism transitional control is requested, the magnetization controller 21b determines a direction of the magnetization processing based on the magnetized state command value Φ*. That is, it determines whether processing for increasing the magnetism of the variable magnetism magnet 35 (magnetization processing) is to be performed, or processing for decreasing the magnetism of the variable magnetism magnet 35 (demagnetization processing) is to be performed. Further, the magnetization controller 21b identifies an amount of change in the magnetism to increase or decrease.

Then, the magnetization controller 21b determines whether the position of the rotor 33 with respect to the stator 34 (a position in the rotational direction) is located at a position suitable for the magnetization processing based on the detection value of the motor rotation sensor 51 (Step S21), and if the rotor 33 is located at the suitable position, it outputs the magnetizing current (Step S22). The magnetizing current is pulse-shaped current which generates an electromagnetic force larger than the coercivity of the variable magnetism magnet 35. The direction of the magnetic flux line of the electromagnetic force is opposite between the magnetization processing and the demagnetization processing.

The magnetization controller 21b determines whether the magnetism of the variable magnetism magnet 35 is substantially the same as the optimum magnetism value specified by the magnetized state command value Φ* (Step S23), and it performs the magnetization processing until the magnetism of the variable magnetism magnet 35 becomes substantially the same as the optimum magnetism value. When resetting the magnetism of the variable magnetism magnet 35, the magnetization processing is performed until the magnetism becomes substantially the same as the initial magnetism.

Then, when the magnetism of the variable magnetism magnet 35 becomes substantially the same as the optimum magnetism value or the initial magnetism, it ends the magnetism transitional control, and as illustrated in FIG. 6, it controls the drive motor 3 by the normal vector control (Steps S8 to S10).

Slip of Clutch

As described above, in this automobile 1, the magnetism transitional control is performed also while the automobile 1 travels. While the automobile 1 is traveling, if the magnetism transitional control to magnetize (magnetization control) is performed, a torque shock may occur in the traveling automobile 1 so that it may give uncomfortableness to the driver.

Figure 8:
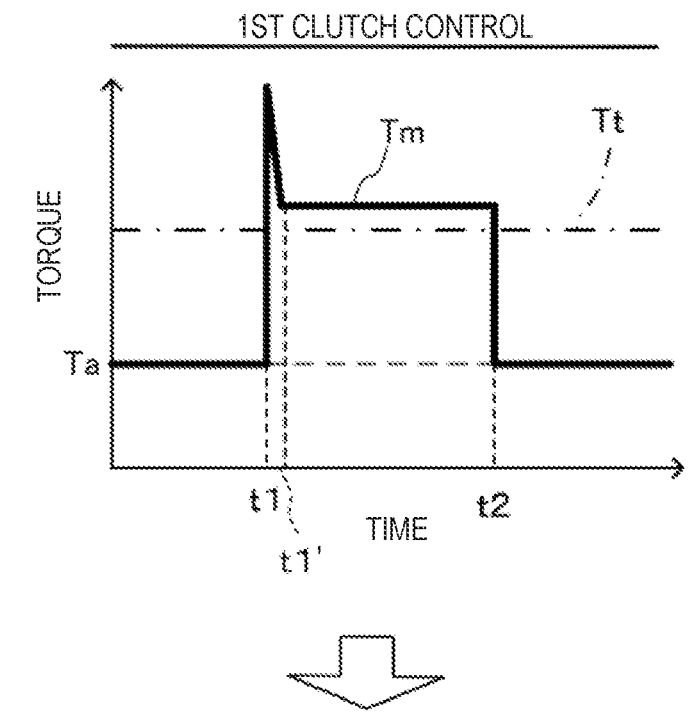
FIG. 8 is a chart illustrating a generation of a torque shock.
Figure 8:
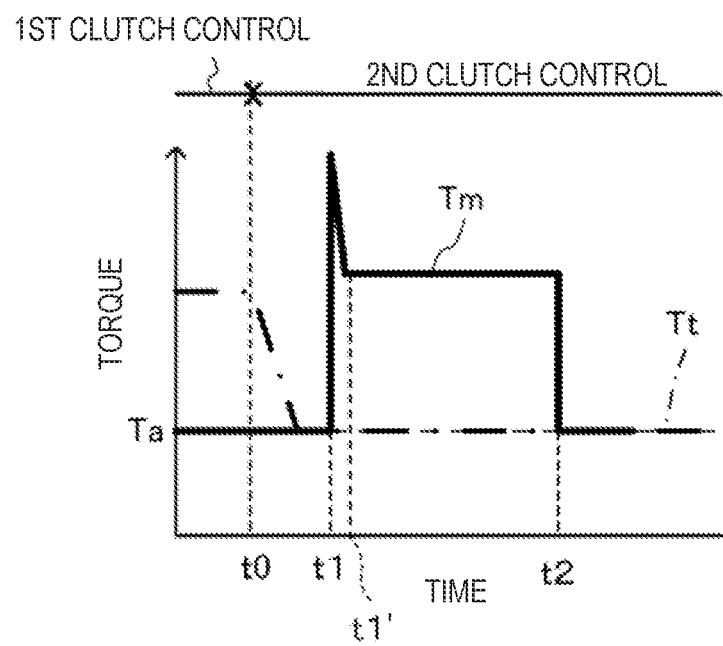

The upper figure of FIG. 8 illustrates a chronological change in a motor torque Tm during the magnetization control. In this illustration, the magnetization processing is performed during a period from time t1 to time t1'. Further, a period from t1' to t2 is a period in which the change in the magnetism is confirmed, and a control (learning control) for learning so that the driving current value (q-axis current value) corresponds to the increased magnetism is performed to make the motor torque Tm coincide with the demanded torque. The learning control is a control accompanying the magnetization and is included in the magnetization control. Ta is the demanded torque. During the traveling of the automobile 1, since the drive motor 3 is torque controlled, the motor torque Tm before the execution of the magnetization control coincides with the demanded torque Ta.

Tt is a clutch engaging torque in the transmission 8. The clutch engaging torque Tt is an engaging torque of the transmission clutch 83 which couples the input shaft 80 of the transmission 8 to the output shaft 81, and is equivalent to a torque which the transmission clutch 83 can transmit to the output side 83b. In order to certainly transmit the motor torque Tm to the driving wheels 4R, the clutch engaging torque Tt is normally controlled so that it is higher than the demanded torque Ta (first clutch control).

During the magnetization control, in order to generate a large electromagnetic force, magnetizing current (d-axis current) is supplied to the coils 36. Therefore, a high voltage greatly exceeding the driving voltage is applied to the drive motor 3. Therefore, as illustrated in the upper figure of FIG. 8, during the magnetization control, a peak-shaped high motor torque Tm greatly exceeding the demanded torque Ta is outputted from the drive motor 3. As a result, the torque shock occurs in the traveling automobile 1 so that it may give uncomfortableness to the driver.

Thus, in order to suppress such a torque shock, in this automobile 1, the MCU 21 collaborates with the TCU 22 to make the transmission clutch 83 slip during the magnetization control (including the accompanying learning control). In detail, it controls so that the clutch engaging torque Tt coincides with the demanded torque Ta (second clutch control).

Figure 9:
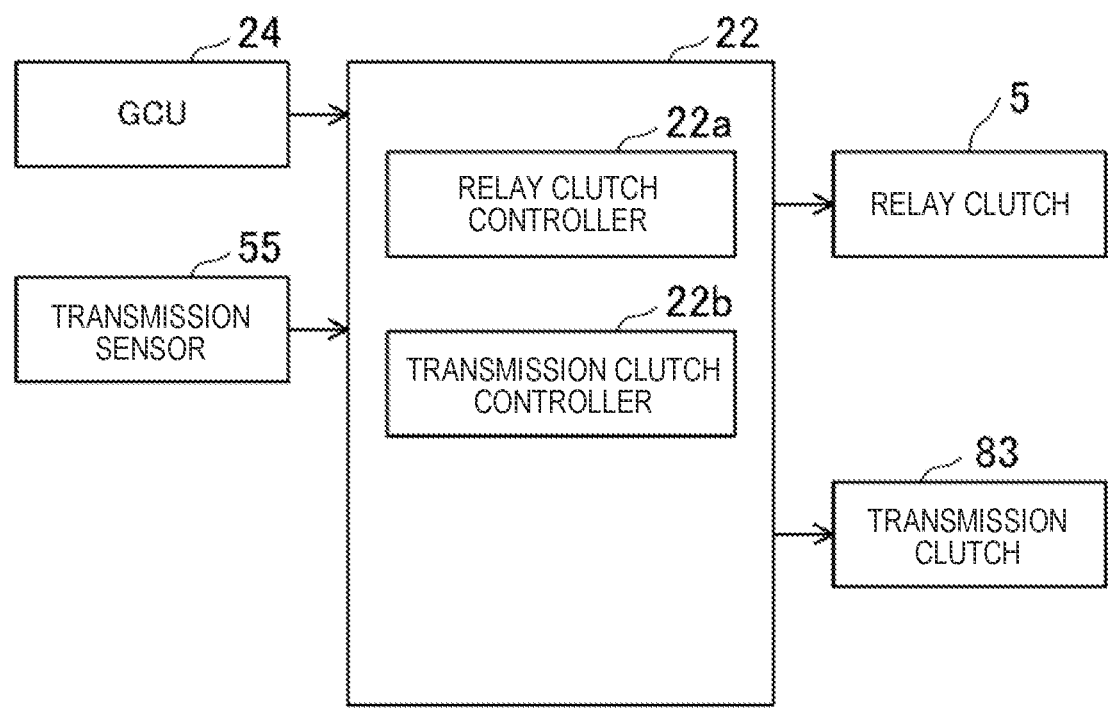
FIG. 9 is a block diagram illustrating a transmission control unit (TCU) and primary I/O devices relevant to the TCU.

FIG. 9 illustrates the TCU 22 and primary I/O devices relevant to the TCU 22. The TCU 22 is provided with a relay clutch controller 22a and a transmission clutch controller 22b by hardware and software, as functional configurations. The relay clutch controller 22a controls operation of the relay clutch 5. The transmission clutch controller 22b controls operation of each of the transmission clutches 83. The transmission clutch controller 22b performs the first clutch control and the second clutch control.

When information on the execution of the magnetism transitional control is acquired from the GCU 24, the transmission clutch controller 22b controls the operation of the transmission clutch 83 in use. In detail, as illustrated in the lower figure of FIG. 8, the transmission clutch controller 22b changes the clutch control from the first clutch control to the second clutch control immediately before (time t0) the start (time t1) of the magnetization control. Therefore, it reduces the clutch engaging torque Tt. As a result, the transmission clutch 83 slips.

At this time, the clutch engaging torque Tt is controlled so that it coincides with the demanded torque. By performing the second clutch control, the torque exceeding the demanded torque can be prevented from being transmitted to the driving wheels 4R, even if the high motor torque Tm is outputted from the drive motor 3. As a result, the torque shock resulting from the magnetization can be suppressed.

Problems in Second Clutch Control and its Solution

When the transmission clutch 83 is made to slip, the phenomenon in which the rotation of the drive motor 3 increases rapidly occurs (so-called "sudden speed rise").

Figure 10:
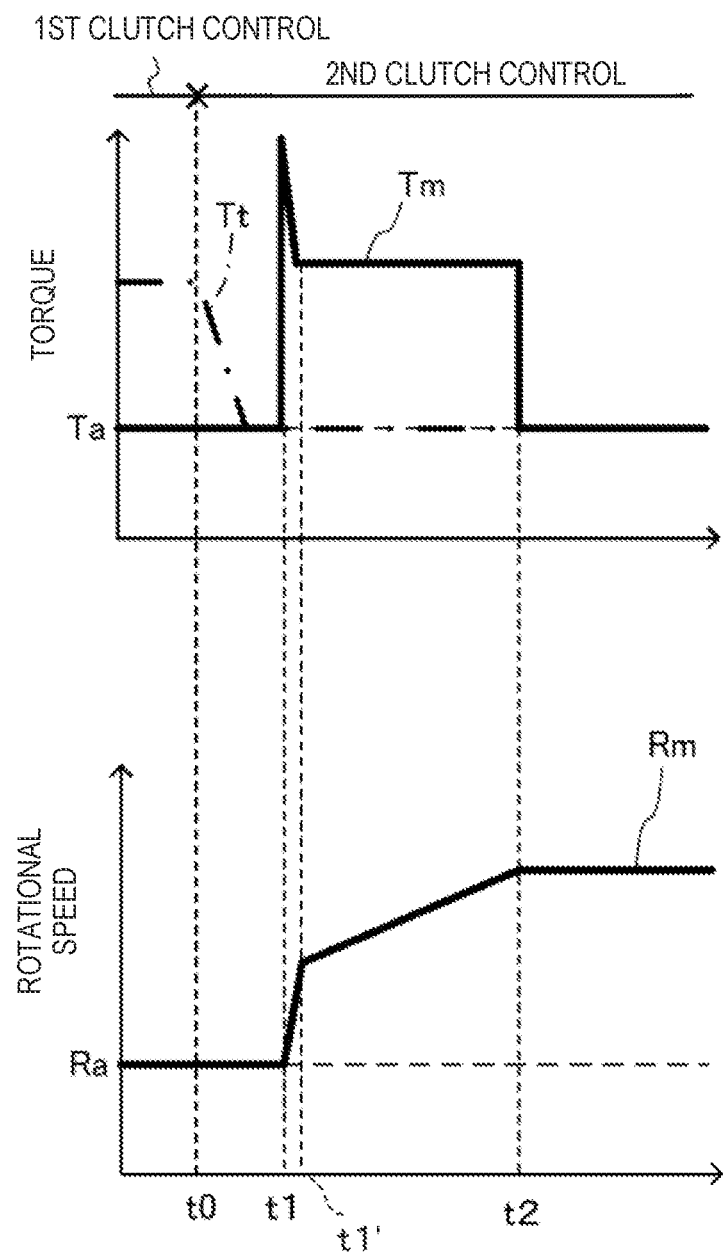
FIG. 10 is a chart for illustrating a phenomenon of sudden speed rise.

FIG. 10 illustrates a relationship between the motor torque Tm and a motor rotational speed Rm during the magnetization control. Note that, here, since the output of the engine 2 is not taken into consideration, the motor rotational speed Rm is also the rotational speed of the input shaft 80 of the transmission 8. Further, the motor torque Tm is equivalent to the torque inputted into the transmission 8 (torque on the input side 83a of the transmission clutch 83: transmission input torque). Since the clutch engaging torque Tt is controlled so that it coincides with the demanded torque, it is equivalent to the torque outputted from the transmission 8 (torque on the output side 83b of the transmission clutch 83: transmission output torque).

The drive motor 3 before the execution of the magnetization control rotates at a given rotational speed Ra. Further, at this time, since the transmission clutch 83 in use is engaged, both the input side 83a and the output side 83b of the transmission clutch 83 also rotate at the rotational speed Ra. Note that the output shaft 81 of the transmission 8 rotates at a rotational speed which is reduced by the planetary gear mechanism 82 corresponding to the transmission clutch 83.

As illustrated in FIG. 10, when the transmission clutch 83 is made to slip during the magnetization control, since the drive motor 3 becomes in the idle state, the motor rotational speed Rm increases instantaneously from the rotational speed Ra corresponding to the demanded torque Ta. The motor rotational speed Rm further increases also during the learning control, and remains high. This sudden speed rise phenomenon may damage the transmission clutch 83 by frictional heat caused by the slip, unless it is eliminated promptly.

Further, in the torque control, the motor torque Tm is controlled so as to coincide with the target torque (demanded torque Ta) according to the current rotational speed. Therefore, after the rotational speed increases according to the sudden speed rise phenomenon, the rotational speed is maintained. That is, the sudden speed rise phenomenon cannot be eliminated by the conventional torque control alone.

In order to promptly eliminate the sudden speed rise phenomenon, the clutch engaging torque Tt which has been coincided with the demanded torque Ta may be increased immediately after the magnetization control. Since the slip decreases, the motor rotational speed Rm decreases so that the sudden speed rise phenomenon can be eliminated. However, accordingly, since the high motor torque Tm is transmitted to the driving wheels 4R as a reaction, the torque shock occurs.

Another measure for promptly eliminating the sudden speed rise phenomenon is to make the target torque in the torque control smaller than the demanded torque Ta, so that the motor torque Tm itself becomes smaller, immediately after the magnetization control. Thus, since the motor rotational speed Rm decreases, the sudden speed rise phenomenon can be eliminated.

However, accordingly, the motor rotational speed Rm may decrease to be lower than the initial rotational speed Ra. In that case, after the sudden speed rise phenomenon is eliminated, the motor rotational speed Rm will not be resumed to the initial state, even if the motor torque Tm is resumed to the demanded torque by the torque control. Because of the shortage of the power of the drive motor 3, uncomfortableness may be given to the driver.

Thus, the previously proposed technique is devised so that, after the magnetization control, the power control for controlling the motor torque Tm is performed based on the power outputted from the drive motor 3 to promptly converge the torque and the rotational speed outputted from the drive motor 3. However, it was found that this technique may cause the torque shock depending on the performance of the transmission clutch 83 to give uncomfortableness to the driver, and therefore, there is room for improvement.

Problem of Friction Coefficient Difference of Transmission Clutch

Generally, the coefficient of dynamic friction ($\mu_d$) of the transmission clutch 83 is set equivalent to the coefficient of static friction ($\mu_s$).

When engaging the transmission clutch 83, the friction coefficient is changed from the coefficient of dynamic friction to the coefficient of static friction. If the coefficient of dynamic friction is equivalent to the coefficient of static friction, the torque shock which gives uncomfortableness to the driver during the engagement of the transmission clutch 83 accompanying the magnetization control will not occur. Therefore, there is no problem also in the previously proposed technique.

However, depending on the transmission clutch 83, the coefficient of dynamic friction may be lower than the coefficient of static friction, and the difference may be large. In such a case, also in the previously proposed technique, the torque shock may occur during the engagement of the transmission clutch 83 accompanying the magnetization control so that it may give uncomfortableness to the driver.

Figure 11:
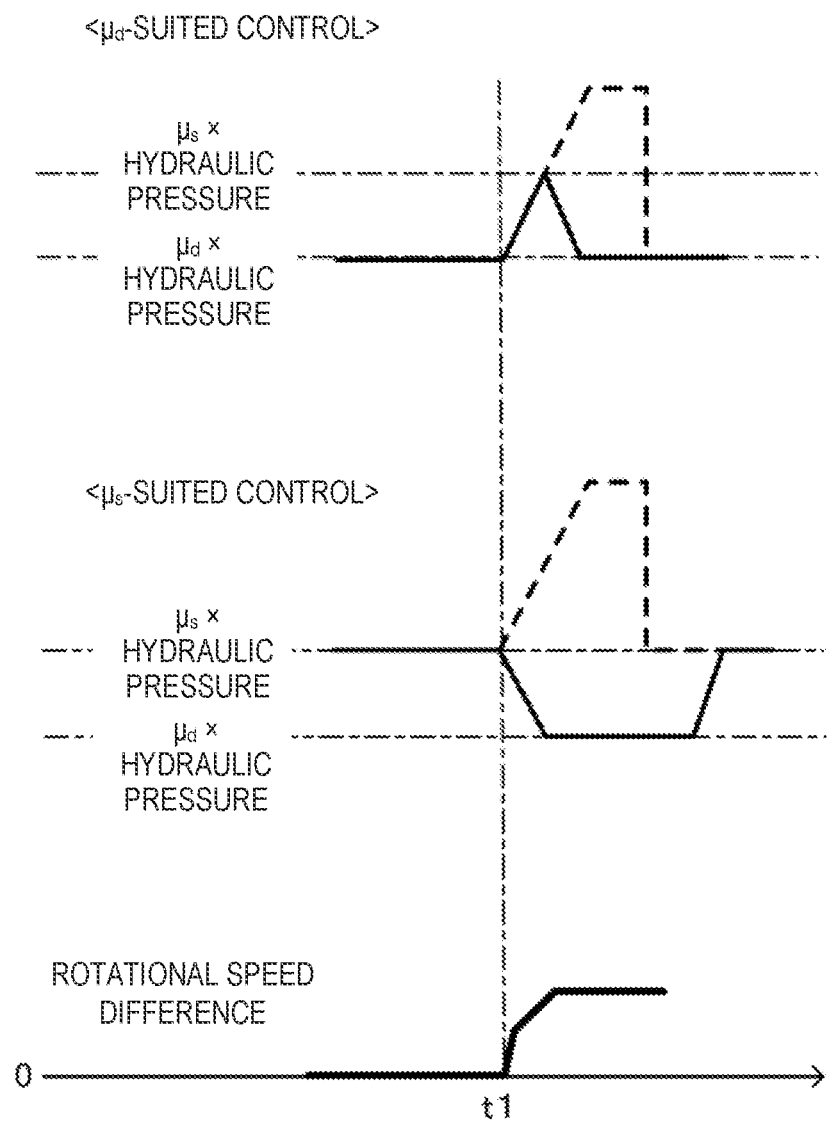
FIG. 11 is a chart illustrating a problem of a friction coefficient difference of a transmission clutch.

This will be described concretely with reference to FIG. 11. The lower figure of FIG. 11 illustrates a chronological change in the rotational speed difference between the input side 83a and the output side 83b of the transmission clutch 83, and the magnetization control is initiated at t1. When there is a difference between the coefficient of dynamic friction and the coefficient of static friction of the transmission clutch 83, the torque control may be a control suited to the coefficient of dynamic friction ($\mu_d$-suited control) and a control suited to the coefficient of static friction ($\mu_s$-suited control).

The upper figure of FIG. 11 illustrates the $\mu_d$-suited control. The middle figure of FIG. 11 illustrates the $\mu_s$-suited control. In these figures, broken lines correspond to the transmission input torque Tm, and solid lines correspond to the transmission output torque Tt. In the $\mu_d$-suited control, since it is controlled based on the coefficient of dynamic friction ($\mu_d$), the target transmission input torque Tm becomes a value obtained by multiplying a hydraulic pressure (pressing force) which acts on the transmission clutch 83 by the coefficient of dynamic friction. On the other hand, in the $\mu_s$-suited control, since it is controlled based on the coefficient of static friction ($\mu_s$), the target transmission input torque Tm becomes a value obtained by multiplying the hydraulic pressure (pressing force) which acts on the transmission clutch 83 by the coefficient of static friction.

In the $\mu_d$-suited control, when the transmission clutch 83 begins to slip with the start of the magnetization control, the transmission output torque Tt also increases up to its upper limit with the increase in the rotational speed difference (the value obtained by multiplying the pressing force by the coefficient of static friction). When a change in the transmission output torque Tt (dashing-out shock) exceeds the human perception level, it may give uncomfortableness to the driver.

Further, in the $\mu_s$-suited control, when the transmission clutch 83 begins to slip with the start of the magnetization control, the transmission output torque Tt decreases to the value obtained by multiplying the pressing force by the coefficient of dynamic friction, in association with the change in the friction coefficient. This state is held until the magnetization control is finished and the transmission clutch 83 is again engaged. When the change in the transmission output torque Tt during this period (drawing-in shock) exceeds the human perception level, it may give uncomfortableness to the driver.

In either control, when the difference between the coefficient of static friction and the coefficient of dynamic friction of the transmission clutch 83 is large, the torque shock which originates in the friction coefficient difference occurs with the magnetization control so that it may give uncomfortableness to the driver.

The torque shock may be suppressed by adjusting the pressing force of the transmission clutch 83 during engagement by the hydraulic control. However, the hydraulic control is slow in the response, and it cannot react quickly. It is not easy to stably suppress the torque shock accompanying the irregular magnetization control with the slow-response hydraulic control.

Thus, this control device 100 is devised so that the change in the magnetism of the drive motor (in detail, the intolerable torque variation which may occur with the magnetization control) can be suppressed by the control of the transmission clutch 83.

In detail, similarly to the previously proposed technique, the first clutch control is performed along with the torque control while the automobile 1 travels. Then, when performing the magnetization control while the automobile 1 travels, the first clutch control is changed to the second clutch control before the execution of the magnetization control. That is, by making the transmission clutch 83 slip, the torque shock which originates in the magnetization is suppressed.

In this control device 100, a given slip torque is added to the demanded torque based on the coefficient of dynamic friction and the coefficient of static friction of the transmission clutch 83 to set a new demanded torque (slight-increase demanded torque). Then, along with the change to the second clutch control (i.e., before the execution of the magnetization control), a control (micro slip control) for making the transmission clutch 83 from the engaged state to a micro slip state based on the slight-increase demanded torque is started.

That is, the transmission clutch 83 is not changed from the engaged state to the disengaged state at the timing where the rotational speed difference of the transmission clutch 83 increases rapidly (when the magnetization is started), but, before that, it is changed to the state where the transmission clutch 83 slips slightly (micro slip state). Therefore, since the friction coefficient can be changed beforehand from the coefficient of static friction to the coefficient of dynamic friction under the condition of the small rotational speed difference, the torque shock which originates in the friction coefficient difference can be suppressed.

In the micro slip state, the transmission clutch 83 is not fully engaged, but the friction coefficient is changed from the coefficient of static friction to the coefficient of dynamic friction. By the change to the second clutch control, the clutch engaging torque coincides with the demanded torque. Therefore, the slip torque which is added to the demanded torque may be any torque as long as it is necessary and sufficient for producing the micro slip state.

During the execution of the micro slip control, it is preferred to perform the power control, instead of the torque control. Further, it is more preferred to perform, after the execution of the magnetization control, a feedback control based on the difference between the rotational speed on the input side 83a of the transmission clutch 83 and the rotational speed on the output side 83b to converge the state to the micro slip state during the execution of the power control.

Thus, along with the torque outputted from the drive motor 3, its rotational speed can also be adjusted with sufficient balance so that the sudden speed rise phenomenon is eliminated promptly. Therefore, the drive motor 3 can be resumed to its initial state in a short period of time after the magnetization.

Power Control and Feedback Control Accompanying Micro Slip Control

In the power control, the torque is controlled so that the power outputted from the driving wheels 4R (i.e., the multiplication value of a torque T and a rotational speed R of the driving wheels 4R) may become a given target power value.

That is, in the power control, the torque control in which not the demanded torque Ta but the motor torque Tm corresponding to the target power value is used as the target torque is performed. If the target power value is constant, when the motor rotational speed Rm is high like at the peak of the sudden speed rise phenomenon, the target torque becomes lower accordingly, and the sudden speed rise phenomenon becomes weaker, and when the motor rotational speed Rm becomes lower, the target torque becomes higher. Therefore, according to the power control, unlike in the torque control, both the rotational speed and the torque can be adjusted with sufficient balance.

Here, the target power value is a value at which the transmission clutch 83 becomes in the micro slip state. Thus, during the execution of the micro slip control, the state can be stably converged to the micro slip state by adjusting both the torque and the rotational speed of the drive motor 3 with sufficient balance.

In detail, here, the target power value is a value obtained by multiplying the slight-increase demanded torque by the rotational speed. For example, the target power value can be set by multiplying a value, which is obtained by multiplying the demanded torque Ta by an actual rotational speed of the drive motor 3, by a given slip ratio (for example, 105%).

The target power value is a value obtained by multiplying the demanded torque Ta by the actual rotational speed and the given slip ratio. Thus, the power control is a supplemental control of the torque control, and is compatible to the torque control. Therefore, these controls can be changed to each other smoothly and easily, and are excellent in the control stability.

After the execution of the magnetization control, the motor torque Tm decreases by the power control, and the motor rotational speed Rm also decreases. However, here, the motor rotational speed Rm changes passively according to the change in the torque. Thus, the motor rotational speed Rm decreases gently. Accordingly, it requires a comparatively long period of time until the motor rotational speed Rm converges to the rotational speed in the micro slip state (micro-slip rotational speed).

Therefore, after the execution of the magnetization control, the feedback control is performed based on the difference between the rotational speed on the input side 83a of the transmission clutch 83 in use and the rotational speed on the output side 83b (rotational speed difference) to converge the state to the micro slip state during the execution of the power control.

When the feedback control is started, a gain adjustment of the torque control is performed according to the rotational speed difference so that the state becomes the micro slip state promptly. Therefore, the transmission clutch 83 can be converged to the initial micro slip state promptly.

Transitional Control

Further, when the micro slip control is started and/or ended, it is preferred to perform a cooperative control utilizing a hydraulic control. In detail, a control for adjusting the hydraulic pressure of the transmission clutch 83 (transitional control) is performed, together with the adjustment of the torque, so that the torque variation (torque shock) which occurs in connection with the change in the state of the transmission clutch 83 before and after the micro slip control may be canceled out.

For example, when the micro slip control is started, the transmission clutch 83 changes from the engaged state to the micro slip state. When the micro slip control is ended, the transmission clutch 83 changes from the micro slip state to the engaged state. In connection with the change in the state of the transmission clutch 83, the torque variation resulting from the friction coefficient difference of the transmission clutch 83 occurs.

Unlike the outputted torque in the magnetization control which is irregular and is difficult to be identified beforehand, the slip torque which is increased or decreased in the micro slip control is a value set beforehand. Since the torque variation which occurs in connection with the change in the friction coefficient when the micro slip control is started or ended is defined by the slip torque, an adjustment according to the torque variation can be performed, even if the control is the hydraulic control which is inferior in the response.

For example, a condition of the hydraulic control which can cancel out the torque variation accompanying the change in the slip torque is set by a preliminary examination, etc., and the hydraulic pressure (pressing force) of the transmission clutch 83 is adjusted based on the condition. Thus, the micro torque shock resulting from the friction coefficient difference which occurs in connection with the micro slip control can also be suppressed. As a result, the magnetism change of the drive motor 3 in the almost shockless state becomes possible.

Concrete Example of Control

Figure 12:
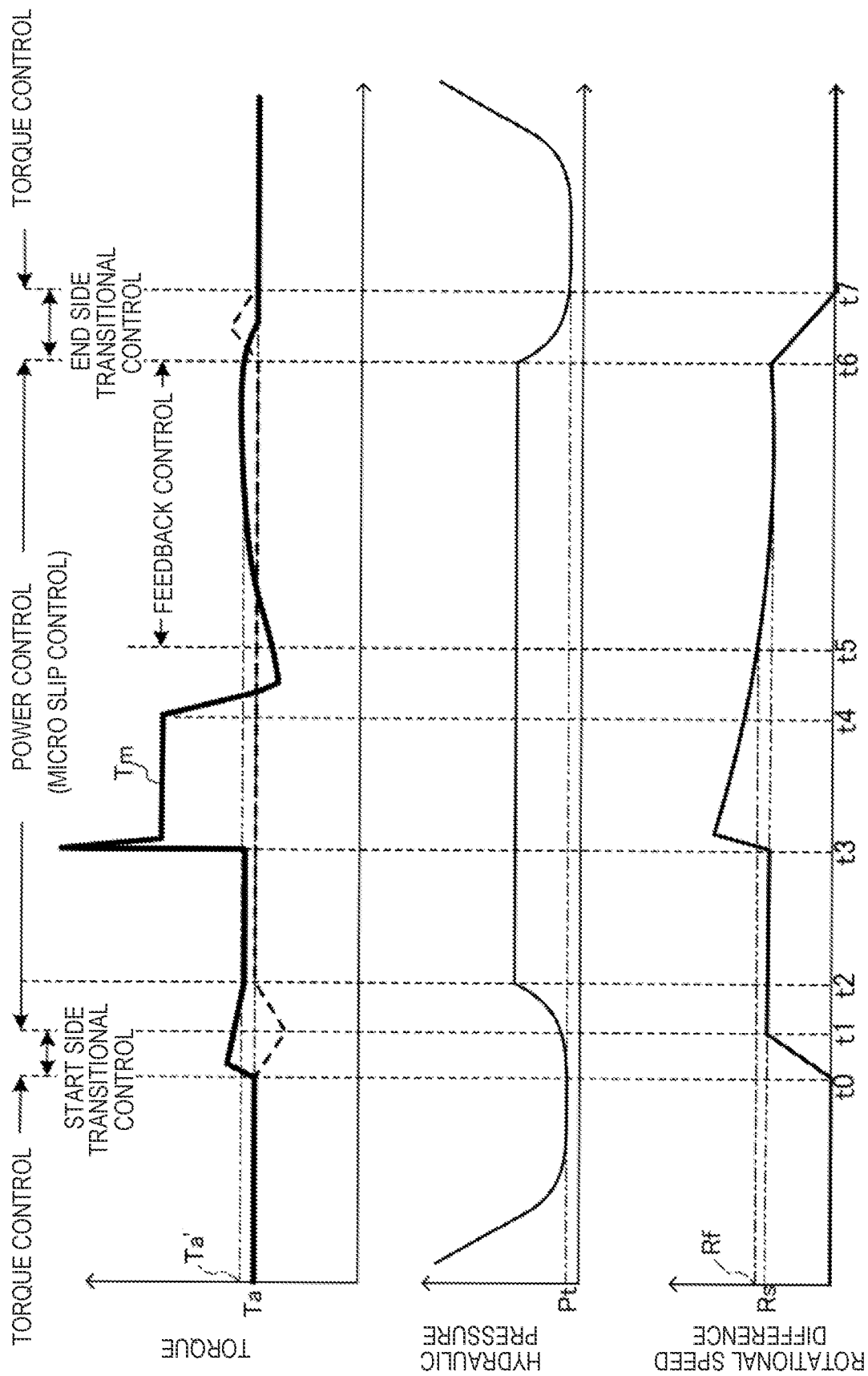
FIG. 12 is a time chart of primary properties before and after a magnetization control to which the disclosed technique is applied.
Figure 13:
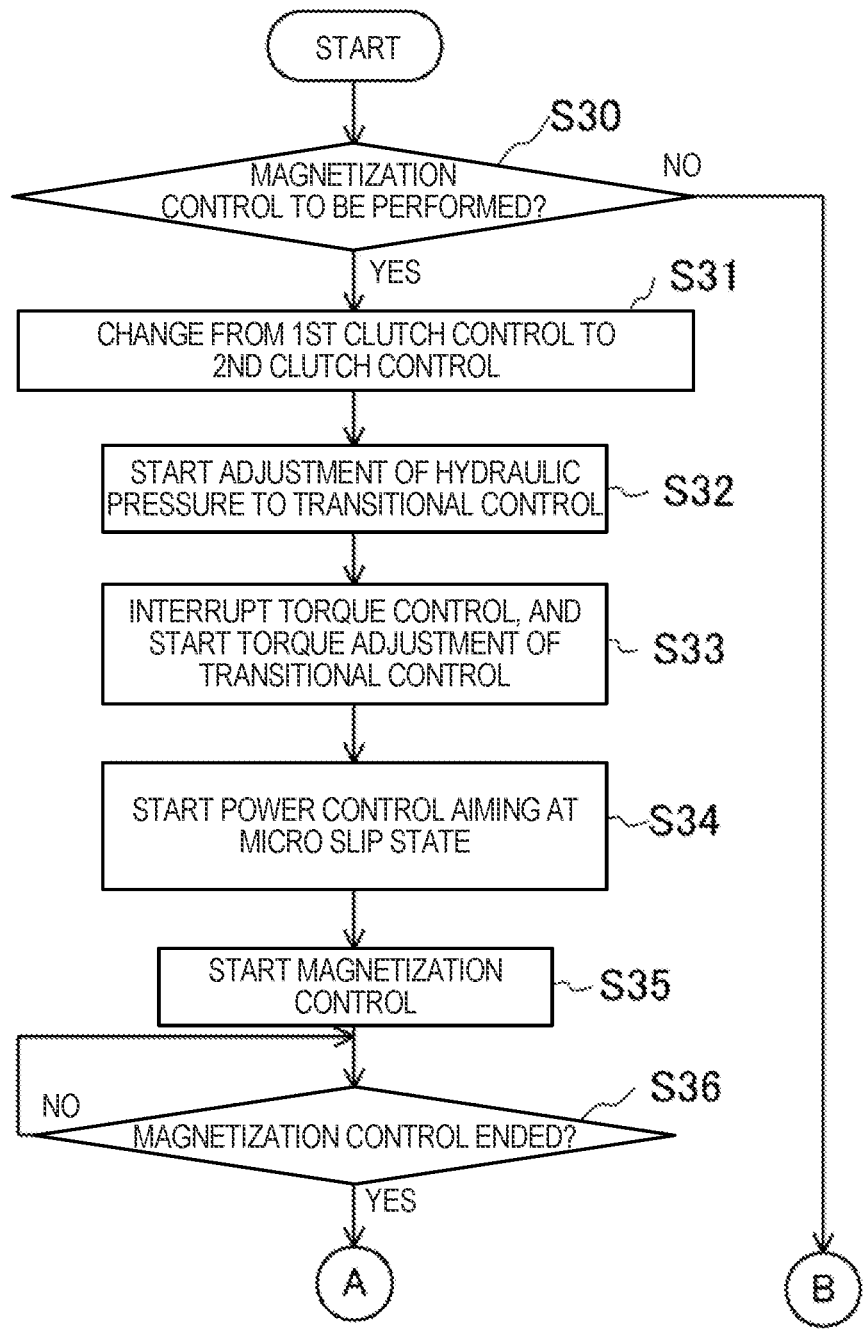
FIG. 13 is a flowchart illustrating one example of a control corresponding to FIG. 12.
Figure 14:
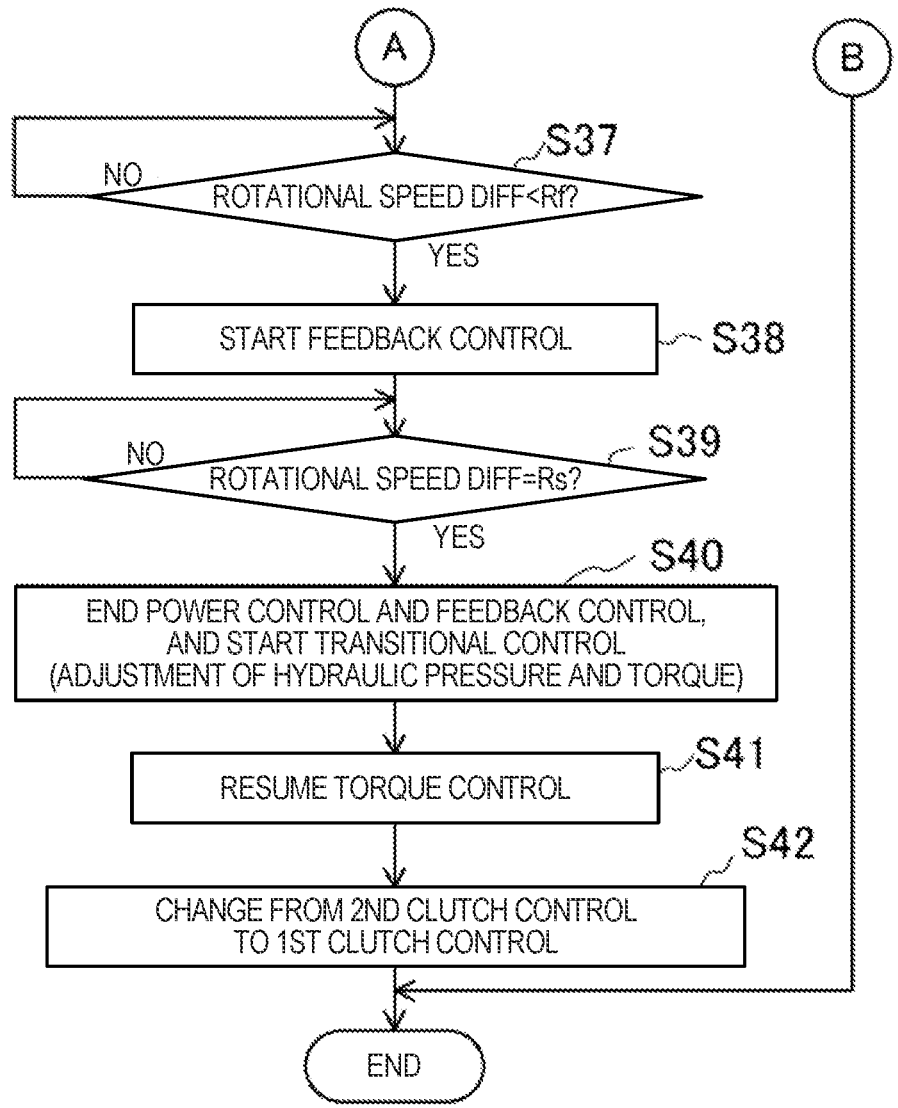
FIG. 14 is a flowchart continued from FIG. 13.

FIGS. 12 to 14 illustrate a concrete example of the micro slip control. FIG. 12 is a time chart of primary properties before and after the magnetization control. FIGS. 13 and 14 are flowcharts of the control corresponding to FIG. 12 which is performed by the control device 100.

In FIG. 12, the upper chart is a time chart related to the torque. A solid line indicates the transmission input torque (motor torque Tm), and a broken line indicates the transmission output torque.

The middle chart is a time chart related to the hydraulic pressure of the transmission 8 (the pressing force of the transmission clutch 83). The lower chart is a time chart related to the rotational speed difference. It indicates the difference between the rotational speed on the input side 83a of the transmission clutch 83 in use, and the rotational speed on the output side 83b.

As illustrated in FIG. 13, the MCU 21 determines whether the magnetization control is to be performed (Step S30). Then, if it is determined that the magnetization control is to be performed, the TCU 22 changes the clutch control from the first clutch control to the second clutch control (Step S31). Therefore, the clutch engaging torque Tt coincides with the demanded torque Ta.

Further, the TCU 22 starts the adjustment of the hydraulic pressure suited to the transitional control performed thereafter (Step S32). In detail, the hydraulic pressure supplied to the transmission 8 is reduced in advance to a given hydraulic pressure setting Pt set beforehand.

Then, after the hydraulic pressure becomes the hydraulic pressure setting Pt (t0 in FIG. 12), the MCU 21 interrupts the torque control, and starts the torque adjustment of the transitional control (Step S33). That is, the demanded torque Ta is changed to the slight-increase demanded torque Ta' by adding the slip torque so that the transmission clutch 83 in use changes from the engaged state to the micro slip state.

Accordingly, the transmission clutch 83 starts the micro slip, and the rotational speed difference increases (t0 to t1 in FIG. 12). Since the friction coefficient changes from the coefficient of static friction to the coefficient of dynamic friction, the transmission output torque decreases accordingly. Note that this example of control illustrates a case where the torque control performs the $\mu_s$-suited control described above.

The TCU 22 raises the hydraulic pressure as the transmission output torque decreases so that the reduction of the transmission output torque is canceled out (t0 to t2 in FIG. 12). Thus, the torque shock resulting from the friction coefficient difference is suppressed, and the torque variation is reduced below the level perceptible to a human. Therefore, the transmission clutch 83 can be changed from the engaged state to the micro slip state, without giving uncomfortableness to the driver.

When the rotational speed difference reaches a rotational speed Rs (micro-slip rotational speed) corresponding to the micro slip state (t1 in FIG. 12), the MCU 21 starts the power control aiming at the micro slip state (Step S34). Therefore, the transmission clutch 83 is converged to the micro slip state, and this state is held. The transmission input torque is stabilized at the slight-increase demanded torque Ta', and the rotational speed difference is stabilized at the micro-slip rotational speed Rs (at or after t2 in FIG. 12). The hydraulic pressure is similarly stabilized at a given hydraulic pressure.

When the transmission clutch 83 becomes in the micro slip state, the MCU 21 starts the magnetization control (Step S35). The period from time t3 to time t4 in FIG. 12 corresponds to the magnetization control (including the learning control). During this period, as described above, the high motor torque Tm is outputted from the drive motor 3. Accordingly, the motor rotational speed Rm increases and the rotational speed difference also increases (sudden speed rise phenomenon).

Meanwhile, by the second clutch control, the clutch engaging torque Tt coincides with the demanded torque Ta. Thus, even if the high motor torque Tm is outputted by the magnetization control, the transmission output torque which is substantially the same as the demanded torque Ta is outputted to the downstream side of the transmission clutch 83. Therefore, the torque shock resulting from the magnetization can be suppressed.

When the magnetization control is ended (Yes at Step S36), the transmission input torque decreases. The power control is performed also during this period. In the power control, as described above, the torque control is performed using the target torque corresponding to the target power value. Therefore, in association with the end of the magnetization control, the increased transmission input torque decreases, and the rotational speed difference also decreases.

However, the rotational speed difference at this time decreases gently. Thus, it takes a comparatively long period of time until it is converged to the micro-slip rotational speed Rs. Therefore, the MCU 21 collaborates with the TCU 22 (transmission clutch controller 22b) and starts the feedback control during the execution of the power control.

That is, as illustrated in FIG. 14, if the rotational speed difference becomes below a reference value Rf (Yes at Step S37), the feedback control is started (Step S38). The reference value Rf is set for the TCU 22 according to the specifications of the transmission 8.

The TCU 22 compares a rotational speed difference which is actually measured or estimated based on the detection value of the transmission sensor 55 with the reference value Rf. Then, if the rotational speed difference is determined to be below the reference value Rf (t5 in FIG. 12), the feedback control is started for the rotational speed of the transmission clutch 83 so that the state is converged to the micro slip state (i.e., the rotational speed difference becomes the micro-slip rotational speed Rs). By the execution of the feedback control, the transmission clutch 83 can be resumed to the micro slip state promptly.

Then, if the rotational speed difference reaches the micro-slip rotational speed Rs (i.e., if the transmission clutch 83 is resumed to the micro slip state) (Yes at Step S39), the power control and the feedback control are ended, and the transitional control is started (Step S40, and t6 in FIG. 12).

That is, the MCU 21 changes the slight-increase demanded torque Ta' to the demanded torque Ta by removing the slip torque so that the transmission clutch 83 changes from the micro slip state to the engaged state.

Accordingly, the rotational speed difference decreases (t6 to t7 in FIG. 12). When the transmission clutch 83 is engaged, since the friction coefficient changes from the coefficient of dynamic friction to the coefficient of static friction, the transmission output torque increases accordingly.

The TCU 22 reduces the hydraulic pressure suited to the increase in the transmission output torque so that the increase in the transmission output torque is canceled out. Thus, the torque shock resulting from the friction coefficient difference is suppressed, and the torque variation is reduced below the level perceptible to a human. Therefore, the transmission clutch 83 can be changed from the micro slip state to the engaged state, without giving uncomfortableness to the driver.

By the series of processings, the sudden speed rise phenomenon is eliminated, and the motor torque Tm and the motor rotational speed Rm are resumed to their initial states. The transmission clutch 83 is also resumed to the engaged state (t7 in FIG. 12). Therefore, the MCU 21 resumes the torque control (Step S41).

The TCU 22 changes the clutch control from the second clutch control to the first clutch control (Step S42). Thus, the clutch engaging torque Tt rises to a normal value (at or after t7 in FIG. 12). The TCU 22 also raises the hydraulic pressure supplied to the transmission 8 to a normal value. Therefore, the drive motor 3 and the transmission 8 are resumed to the state before the magnetization control.

Thus, according to the control device 100 to which the disclosed technique is applied, even if the magnetization control in which the motor torque Tm higher than the demanded torque occurs is performed while the automobile 1 travels, the torque shock which originates in the magnetization can be suppressed by the second clutch control. Further, since the sudden speed rise phenomenon of the drive motor 3 which occurs with the slip of the transmission clutch 83 can also be eliminated promptly by the power control and the feedback control, the suitable control state can be resumed smoothly.

Further, the torque shock which originates in the friction coefficient difference of the transmission clutch 83 can also be suppressed by the micro slip control. Therefore, even when there is a large difference between the coefficient of dynamic friction and the coefficient of static friction of the transmission clutch 83, there is no concern of giving uncomfortableness to the driver.

According to this control device 100, the torque variation which occurs with the magnetism change of the drive motor 3 can be suppressed, without being influenced by the performance of the transmission clutch 83. Since the applicable range of the transmission clutch 83 expands, it excels in convenience.

Note that the disclosed technique is not limited to the above embodiment, and it also includes various other configurations. For example, various kinds of configurations exist for the drive motor 3, the transmission 8, etc. The same is true for the automobile 1. Therefore, these configurations may be selected according to the specifications, and the disclosed technique may be applied according to the specifications.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Automobile (Electric Vehicle)
2 Engine
3 Drive Motor
4R Driving Wheel
5 Relay Clutch
8 Transmission
10 Battery
20 Engine Control Unit (ECU)
21 Motor Control Unit (MCU)
21a Motor Output Controller
21b Magnetization Controller
22 Transmission Control Unit (TCU)
22a Relay Clutch Controller
22b Transmission Clutch Controller
23 Brake Control Unit (BCU)
24 General Control Unit (GCU)
33 Rotor
34 Stator
35 Magnet (Variable Magnetism Magnet)
80 Input Shaft
81 Output Shaft
82 Planetary Gear Mechanism
83 Transmission Clutch
83a Input Side
83b Output Side

What is claimed is:

1. A control device for an electric vehicle including a drive motor of which magnetic poles of a rotor are comprised of variable magnetism magnets that are able to change magnetism, and a clutch disposed between the drive motor and driving wheels, the electric vehicle being traveable using electric power, the control device being configured to:

when the electric vehicle travels, perform a torque control in which a motor torque outputted from the drive motor is controlled so that the motor torque coincides with a demanded torque demanded to be outputted to the driving wheels, and a first clutch control in which an engaging torque of the clutch is controlled to be higher than the demanded torque; and when performing a magnetization control in which the magnetism of the variable magnetism magnets is changed to magnetize the variable magnetism magnets when the electric vehicle travels:

change a clutch control from the first clutch control to a second clutch control in which the engaging torque is made to coincide with the demanded torque, before the execution of the magnetization control; and add a given slip torque to the demanded torque based on a coefficient of dynamic friction and a coefficient of static friction of the clutch to start a micro slip control in which the clutch is transitioned from an engaged state into a micro slip state.

2. The control device of claim 1, wherein when the micro slip control is started, a transitional control is performed, the transitional control including adjusting a hydraulic pressure of the clutch so that a torque variation caused in connection with the clutch transitioning from the engaged state to the micro slip state is canceled out.

3. The control device of claim 2, wherein during the execution of the micro slip control, a power control is performed instead of the torque control, the power control including controlling the motor torque so that power outputted from the driving wheels coincides with a given target power value.

4. The control device of claim 3, wherein after the execution of the magnetization control, a feedback control is performed based on a difference between a rotational speed on an input side of the clutch and a rotational speed on an output side to converge a state to the micro slip state during the execution of the power control.

5. The control device of claim 1, wherein when the micro slip control is ended, a transitional control is performed, the transitional control including adjusting a hydraulic pressure of the clutch so that a torque variation caused in connection with transitioning the clutch from the micro slip state to the engaged state is canceled out.

6. The control device of claim 1, wherein during the execution of the micro slip control, a power control is performed instead of the torque control, the power control including controlling the motor torque so that power outputted from the driving wheels coincides with a given target power value.

7. The control device of claim 6 wherein after the execution of the magnetization control, a feedback control is performed based on a difference between a rotational speed on an input side of the clutch and a rotational speed on an output side to converge a state to the micro slip state during the execution of the power control.

8. The control device of claim 7, wherein when the micro slip control is ended, a transitional control is performed, the transitional control including adjusting a hydraulic pressure of the clutch so that a torque variation caused in connection with transitioning the clutch from the micro slip state to the engaged state is canceled out.

* * * * *